(12) United States Patent
Beall et al.

(10) Patent No.: US 6,562,284 B2
(45) Date of Patent: May 13, 2003

(54) FABRICATION OF ULTRA-THINWALL CORDIERITE STRUCTURES

(75) Inventors: Douglas M. Beall, Painted Post, NY (US); Gregory A. Merkel, Painted Post, NY (US); Brian E. Stutts, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/027,993

(22) Filed: Dec. 19, 2001

(65) Prior Publication Data

US 2002/0130447 A1 Sep. 19, 2002

Related U.S. Application Data

(60) Provisional application No. 60/258,729, filed on Dec. 29, 2000.

(51) Int. Cl.$^7$ .............................................. C04B 35/195
(52) U.S. Cl. .............. 264/631; 264/177.11; 264/177.12
(58) Field of Search ................. 264/631, 630, 264/638, 639, 177.11, 177.12

(56) References Cited

U.S. PATENT DOCUMENTS

| | | |
|---|---|---|
| 2,684,919 A | 7/1954 | Berry et al. |
| 3,885,977 A | 5/1975 | Lachman et al. |
| 6,004,501 A | 12/1999 | Cornelius et al. |
| 6,048,490 A | 4/2000 | Cornelius et al. |
| 6,087,281 A | 7/2000 | Merkel |
| 6,284,693 B1 | 9/2001 | Beall et al. |

*Primary Examiner*—James Derrington
(74) *Attorney, Agent, or Firm*—Kees van der Sterre; Timothy M. Schaeberle

(57) ABSTRACT

This invention relates to a method of producing a honeycomb ceramic body exhibiting a predetermined radial dimension comprising producing a green ceramic honeycomb body that exhibits a radial dimension at least 9% greater than the predetermined radial dimension and a cell density of at least 500 cpsi. The method further involves shrinking the green body during firing to form a sintered honeycomb ceramic body exhibiting the final predetermined radial dimension. This invention also relates to a method of producing a ceramic body comprising the following steps:

(a) compounding and plasticizing a ceramic raw material mixture and forming the plasticizable raw material mixture into a green ceramic body by extrusion through an extrusion die;

(b) drying the green body and thereafter firing the green body at a time and at a temperature sufficient to sinter the ceramic body resulting in a radial shrinkage of the green ceramic body in the radial dimension due to the firing of at least 9%.

8 Claims, 1 Drawing Sheet

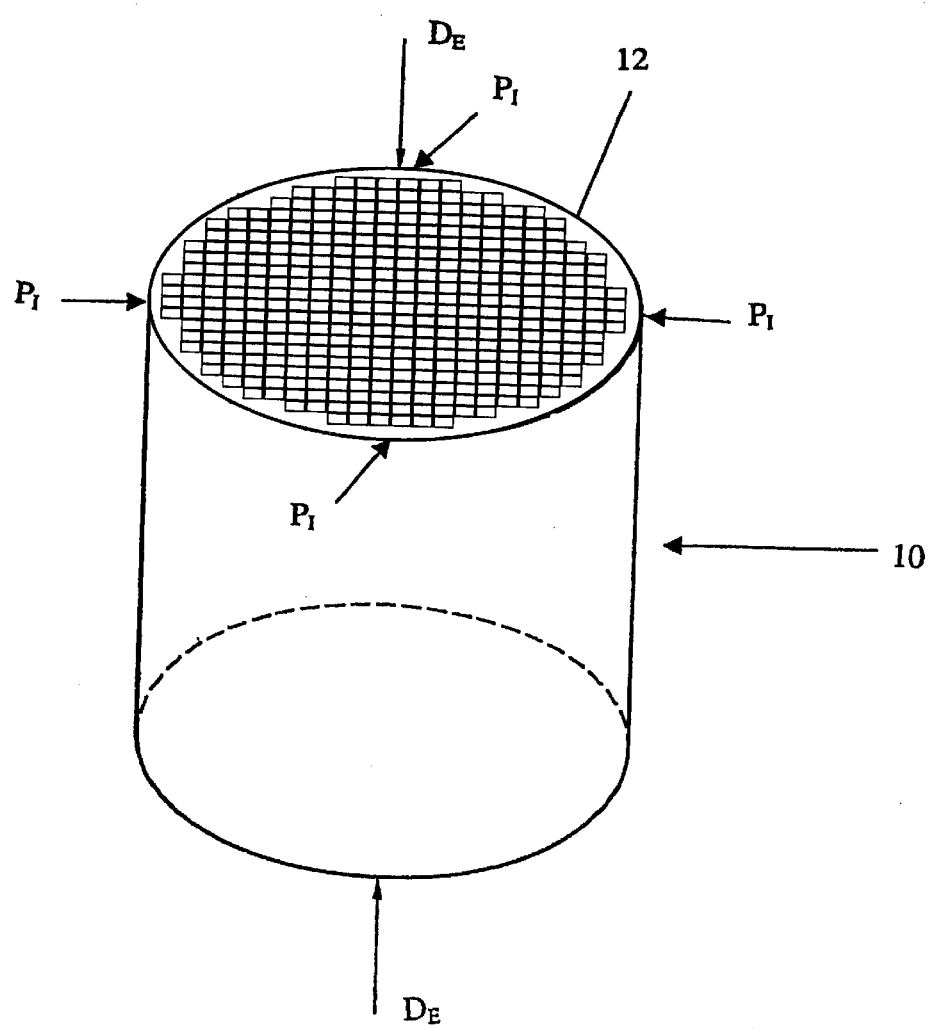

FABRICATION OF ULTRA-THINWALL CORDIERITE STRUCTURES

This application claims the benefit of U.S. Provisional Application No. 60/258,729, filed Dec. 29, 2000, entitled "Fabrication of High Density, High Geometric Surface Area Ceramic Honeycombs", by Beall et al.

BACKGROUND OF THE INVENTION

1. Field of the Invention

The invention relates to cordierite ceramic bodies for use as catalyst carriers, particularly to cordierite bodies, having ultra-thin web sizes, for use as catalyst carriers for purifying automobile exhaust gas, and particularly to a method for producing these ultra thinwall cordierite structures.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of pollutants from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to cordierite ceramics' high thermal shock resistance. The production of cordierite ($2MgO.2Al_2O_3.5SiO_2$) ceramics from mineral batches containing sources of magnesium, aluminum and silicon such as clay and talc is well known. Such a process is described in U.S. Pat. No. 2,684,919. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one axis.

Manufacturers work continuously to optimize the characteristics of cordierite substrates to enhance their utility as catalyst carriers. Specifically, manufacturers continually strive to develop cordierite honeycomb substrates that exhibit high geometric surface area, which in turn leads to increased emission conversion efficiency and reduced precious metal catalyst loading. One means for achieving this increased surface area is too create substrates exhibiting a higher cell density. Demand for cordierite monoliths having increased geometric surface area (i.e., higher cell densities) is increasing in response to legislation requiring higher conversion efficiencies in catalytic converters for the automobile market.

One means to achieve the production of ceramic honeycombs with higher cell densities and increased geometric surface areas is the use of more sophisticated, higher cell density die designs capable of producing these higher cell density substrates. Specifically, these aforementioned more sophisticated die designs exhibit a discharge slot array comprising a very large number of very fine slots; i.e., higher and higher slot densities and therefore more densely packed and smaller feedholes.

The principal difficulty encountered with these slot arrangements is that there is a practical minimum feedhole size, due principally to drilling technology limitations, which limits the density of the feedhole patterns available. Thus, even at minimum attainable feedhole sizes, a too close spacing of feedholes produces a weak die structure. Also the smaller feedhole sizes increase the flow impedance of the die necessitating higher extrusion pressures. In general, then, a feedhole pattern permitting the use of smaller and/or more densely packed feedholes provides both die fabrication and die performance disadvantages.

In addition to the practical difficulty of reduced die feedhole sizes leading to weakened dies, the production of honeycomb substrates with very high cell densities/ high geometric surface areas is very difficult, when compared with substrates with lower cell density having a more conventional geometry. It has been found that when conventional high slot density extrusion apparatus are used to produce ceramic honeycombs with cell density exceeding 500 cells per $in^2$, an unacceptably high number of breaks in the web of the cellular extrudate (i.e., areas containing no ceramic material) are observed in the extruded product. It is thought that these breaks in the ceramic material result from one or more particles from the extrusion material plugging a slots in the extrusion die, resulting in a region where batch is restricted from flowing. The number of breaks increases as the slot width decreases, and if the slot width is narrow enough, the number of plugged cells becomes so great that the extrudate does not hold together, but rather the extrusion consists of many small strands of batch material.

An additional means for producing increased cell density substrates includes the development of multi-component dies. Although multi-component die designs solves the limitations of conventional one-piece die design, specifically the weakness of die with narrow slots/feedholes and difficulty or inability to drill very small feedholes/slots, these multi-component die designs are extremely complicated and expensive to produce.

The discovery of a method of higher cell density, increased surface area ceramic honeycombs that overcome the aforementioned shortcomings of conventional methods and a method that is capable of being used with conventional extrusion apparatus would be highly desirable and an advancement in the art.

SUMMARY OF THE INVENTION

It is therefore a principal object of the present invention to provide an improved method for making high cell density, ceramic bodies, that produces little, if any discontinuities in the ceramic article and which can be utilized with conventional extrusion apparatus/dies. In spite of prior art that that suggests that high shrinkage should be avoided in the formation of ceramic honeycomb bodies, it has been found that when certain combinations of raw materials are used, the raw materials upon firing shrink so as to result in the radial shrinkage of the honeycomb body. Specifically, it has been discovered that certain combination of fine and high surface area raw materials, e.g., talc, clay and alumina for cordierite, when used in the preparation of ceramic honeycomb structures, form, upon extrusion a green body that will be subject to greater than 9% radial shrinkage upon subsequent firing.

More specifically, this invention relates to a method of producing a honeycomb ceramic body exhibiting a predetermined radial dimension comprising producing a green ceramic honeycomb body that exhibits a radial dimension at least 9% greater than the predetermined radial dimension and a cell density of at least 500 cpsi. The method further involves shrinking the green body during firing to form a sintered honeycomb ceramic body exhibiting the final predetermined radial dimension.

This invention also relates to a method of producing a ceramic body comprising the following steps:

(a) compounding and plasticizing a ceramic raw material mixture and forming the plasticizable raw material mixture into a green ceramic body by extrusion through an extrusion die;

(b) drying the green body and thereafter firing the green body at a time and at a temperature sufficient to sinter the ceramic body resulting in a radial shrinkage of the green ceramic body in the radial dimension due to the firing of at least 9%.

The advantage of the aforementioned methods is that the utilization of these methods involving a high degree of radial shrinkage is used, allows the formation of increased cell density honeycomb bodies the use of a conventional and much less expensive die design is made possible rather than the use of a combination of a multi-component die and low level of shrinkage-materials.

BRIEF DESCRIPTION OF THE DRAWINGS

FIG. 1 illustrates a typical honeycomb ceramic body and includes designations of the radial shrinkage direction exhibited by the honeycomb.

DETAILED DESCRIPTION OF THE INVENTION

The present invention discloses a method for producing cordierite honeycomb monoliths with very thin webs. Specifically, it relates to a method of extruding a novel mixture of ceramic batch materials together with a binder and extrusion vehicle to produce a honeycomb body. Upon firing the dried green body, the green body undergoes a large radial shrinkage. For purposes of this invention, radial direction is defined as shrinkage of a ceramic body in a direction in the plane perpendicular to the extrusion direction.

The method according to the instant invention relates to producing a honeycomb ceramic body; the honeycomb body to be produced exhibits a predetermined radial dimension. The method involves producing a green ceramic honeycomb body that exhibits a radial dimension at least 9% greater than the predetermined radial dimension. The method further involves shrinking the green body during firing to form a sintered honeycomb ceramic body exhibiting the final predetermined radial dimension and a cell density of at least 500 cpsi.

This invention also relates to a method of producing a ceramic body comprising the following steps:

(a) compounding and plasticizing a ceramic raw material mixture and forming the plasticizable raw material mixture into a green ceramic body by extrusion through an extrusion die;

(b) drying the green body and thereafter firing the green body at a time and at a temperature sufficient to sinter the ceramic body resulting in a radial shrinkage of the green ceramic body in the radial dimension due to the firing of at least 9%.

Preferably the radial firing shrinkage ranges from 11 to 14%; shrinkage higher than about 14% should be avoided as this amount of shrinkage is likely to result in the cracking of the body during sintering. Furthermore, shrinkage greater than 14% likely results in honeycomb bodies that are too dense to effectively washcoat with a slurry containing catalytic materials.

The advantage of the aforementioned methods is that the utilization of these methods involving a high degree of radial shrinkage, allows the formation of increased cell density honeycomb bodies through the use of a conventional and much less expensive die design and therefore avoids the use of a combination of a multi-component die and low level of shrinkage-materials.

The methods disclosed herein are most suitable for forming fired or sintered honeycomb ceramic bodies exhibiting a cell density of at least 500 cpsi (green cell density of approximately at least 410) Ceramic honeycombs substrates exhibiting a cell density of at least 600 cpsi (green cell density of approximately at least 500) and ceramic honeycombs substrates exhibiting a cell density of at least 900 cpsi (green cell density of approximately at least 750) are capable of being produced utilizing these inventive methods For purposes of describing the invention, cordierite articles will be described, however, it is to be understood that the invention is not limited to this specific ceramic type. For instance, it is contemplated that this inventive method of forming ceramic articles can be used in the formation of aluminum titanate ceramic honeycombs.

The present invention overcomes the problems associated with extrusion of very high density, high surface area geometry substrates by using firing shrinkage as a way to achieve the very high density/surface area geometry. Referring to FIG. 1, the composition materials are selected to generate a radial shrinkage upon firing wherein the shrinkage in the plane perpendicular to the direction of extrusion DE or perpendicular to the honeycomb substrate's 10 inlet face 12 plane defined by $P_f$. In this way, wider slots may be used in the die, allowing for much fewer extrusion defects such as breaks in the web from plugged die slots, distorted cells arising from differential flow, and slump due to the presence of thicker webs in the wet extrudate. The dried green extrudate is then fired in the conventional manner, and during sintering and densification of the body, a high degree of radial shrinkage may be encountered if the raw materials have been chosen correctly.

Typically, in the preparation of cordierite articles, talc and clay raw particles are mixed in proportion with sources of alumina and silica yielding precursors to provide the raw material mixture having a composition, in percent by weight of 11 to 17% MgO, 33 to 41% $Al_2O_3$ and, 46 to 53% $SiO_2$. The present invention involves the determination that the utilization of raw materials that exhibit a high surface area and possess a small average particle size result in the requisite shrinkage 9% green body shrinkage. In accordance with the present invention provided is a plasticizable mixture for use in preparing a substrate having cordierite as its primary phase. Specifically, the plasticizable mixture is made up of a raw material mixture specifically comprising the following:

(1) a magnesium source comprising either a platy or blocky talc exhibiting a mean particle size of less than about 10 $\mu$m when measured by a Sedigraph particle analyzer (Micromeritics), preferably rutile or anatase;

(2) an $Al_2O_3$ forming source comprising an alumina having a mean particle size of less than about 5 $\mu$m selected from the group consisting of -alumina, transition aluminas, aluminum oxide monohydroxide, or aluminum trihydrate having; and, (3) one or more of the components of kaolin, calcined kaolin and silica, wherein the kaolin, if present, comprises delaminated kaolin having a mean particle size of less than about 2 $\mu$m and a surface area of greater than about 10 $m^2/g$, the calcined kaolin, if present, exhibits a mean particle size of less than about 2 μm, and silica, if present, exhibits mean particle size of less than about 2 μm.

The choice of inorganic raw materials is critical to achieve the desired shrinkage effects. The materials should be chosen to give a stoichiometry close to that of cordierite. The high level of shrinkage is achieved by using materials with a very high surface area and fine particle size.

The silica forming source comprises silica raw materials including fused $SiO_2$; colloidal silica; crystalline silica, such as quartz or cristobalite, or a low-alumina substantially alkali-free zeolite. Additionally, the silica-forming source can comprise a compound that forms free silica, when heated, for example, silicic acid or a silicon organometallic compound.

The $Al_2O_3$-forming source, for the purposes of the instant invention is a compound which, when heated, forms $Al_2O_3$. Regarding the $Al_2O_3$ source, that material is selected from the group consisting of alumina, aluminum hydroxide, aluminum oxyhydroxide, and combinations thereof. A particularly preferred source comprises a highly reactive α-alumina or aluminum hydroxide having a particle size of about one micron or less. A more preferred $Al_2O_3$ forming materials having a surface area greater than 40 $m^2/g$, that material includes a compound selected from the group consisting of "transition" or activated aluminas, such as gamma alumina, and aluminum oxyhydroxide; preferably this source comprises boehmite or pseudoboehmite.

Most preferred for this application is the use of a dispersible boehmite with surface area in excess of 100 $m^2/gm$. The boehmite should be used in levels greater than about 5% by weight of the batch, and preferably greater than about 10% by weight. Silica particles with very high surface area (>50 $m^2/gm$) may also be used, preferably in levels greater than about 5 weight %. If calcined clay is used, it should be very fine, preferably with average particle size less than 2 μm, and more preferably less than 1 μm with a surface area >10 $m^2/gm$.

The magnesium source comprises a talc exhibiting either a platy or blocky talc, wherein platy talc being talc that exhibits a platelet particle morphology, that is, particles having two long dimensions and one short dimension, or, a length and width of the platelet that is much larger than its thickness.

The aforementioned raw materials of which the plasticized mixture is comprised are combined in a mixing step sufficient to produce an intimate mixing of the raw material phases to allow complete reaction in thermal processing. A binder system is added at this point to help create an extrudable mixture that is formable and moldable. A preferred binder system for use in the present invention comprises a cellulose ether binder component selected from the group consisting of methylcellulose, methylcellulose derivatives, and combinations thereof, a surfactant component, preferably stearic acid or sodium stearate, and a solvent comprising water. Excellent results have been obtained utilizing a binder system which comprises the following amounts, assuming 100 parts by weight of the inorganic, alumina and silica forming sources and talc, raw material mixture: about 0.2 to 2 parts by weight of the sodium stearate, about 2.5 to 6.0 parts by weight of a methylcellulose or a hydroxypropyl methylcellulose binder, and about 20–50 parts by weight of the water.

The individual components of the binder system are mixed with a mass of the inorganic powder material, e.g., the talc, alumina and silica forming sources mixture, in a suitable known manner, to prepare an intimate mixture of the ceramic material and the binder system capable of being formed into a ceramic body by, for example, extrusion. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a thin-walled honeycomb substrate suitable for use as a catalyst support, extrusion through a die is preferable.

The prepared ceramic green body is then dried for a period of about 5–20 minutes prior to firing by any conventional method such as either hot-air or dielectric drying. The dried green body is thereafter fired at a sufficient temperature for a sufficient time to result in a fired ceramic body containing cordierite as its primary phase. The firing conditions can vary depending on the process conditions such as specific composition, size of the green body, and nature of the equipment. However, some preferred firing conditions are as follows:

heating the green body to a temperature of between about 1380° C. to about 1450° C. holding at this temperature for about 6 hours to about 16 hours, and thereafter cooling the green body to room temperature.

As indicated previously, a primary utility of the mixtures described herein is for preparing high strength cordierite honeycomb substrates useful as catalyst carriers. Although the invention is particularly advantageous for preparing thin-walled honeycombs, the claimed mixtures can also be used for thicker walled structures. Methods of applying catalysts to the honeycomb structures, and utilizing those structures, for example, in automobile exhaust systems, are well known in the art. The mixtures may also be useful for preparing other high strength cordierite structures, such as filters.

EXAMPLES

To further illustrate the principles of the present invention, there will be described several examples of the ceramic bodies formed according to the invention, as well as several comparison examples. However, it is to be understood that the examples are given for illustrative purpose only, and the invention is not limited thereto, but various modifications and changes may be made in the invention, without departing from the spirit of the invention.

Examples 1–11

Inorganic powder batch mixtures, as listed in percent by weight, suitable for the formation of a ceramic body having cordierite as its primary crystalline phase are listed in Table I. Each of compositions 1–11 was prepared by combining and dry mixing together the components of the designated inorganic mixture as listed in Table I. To these mixtures was added an appropriate amount of organic binder and this intermediate mixture was thereafter further mixed with deionized water to form a plasticized ceramic batch mixture.

Table I additionally reports the radial shrinkage, upon firing of the so-formed honeycomb bodies various properties of the commercially available raw materials utilized in Examples, specifically those properties discussed as being important for the formation of cordierite bodies capable of exhibiting the requisite radial shrinkage. Included in the table are the following important raw material characteristic properties: morphology index, the surface area ($m^2/g$) and average particle diameter ($\mu m$).

Each of the various plasticized mixtures was extruded through an extruder under conditions suitable to form 2 in. diameter (6.35 mm), 6 in long, about 900 cell/$in^2$ fired honeycomb substrates having and 2.85–3.25 (0.20 mm) thick cell walls. The green ceramic honeycombs formed from each of the 11 batch compositions were sufficiently dried to remove any water or liquid phases that might be present and thereafter subjected to a heating and firing cycle sufficient to remove the organic binder system from, and to sinter, the extruded rods and honeycombs. Specifically, the green bodies of each type substrates were fired to between 1405 and 1430° C. and held for a period of about 10 hours; i.e., firing conditions suitable for forming ceramic bodies having cordierite as their primary phase.

Table I additionally reports the radial shrinkage properties for the ceramics produced from the batches reported in the Table. An examination of Table I reveals that each of the batch mixtures listed therein exhibits the requisite green body radial firing shrinkage, of at least 9%; radial shrinkage values ranging from 9.1% to 13.9%.

Table II lists a series of comparative inorganic powder batch mixtures, as listed in percent by weight, suitable for the formation of a ceramic body having cordierite as its primary crystalline phase. Each of compositions 12–18 were prepared in the same manner to form the same honeycomb structures as detailed for the aforementioned inventive samples.

Table II additionally reports the radial shrinkage properties for the ceramics produced from the batches reported in the Table. An examination of Table II reveals that each of the batch mixtures listed therein produces green body outside the scope of the invention; the radial green body firing shrinkage of the comparative examples all are less than 9% ranging from 6.2 to 8.3%.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

TABLE II

| | 12 | 13 | 14 | 15 | 16 | 17 | 18 |
|---|---|---|---|---|---|---|---|
| Macrocrystalline Talc (coarse) (6.2 $\mu m$) | 40.68 | | | | 40.68 | | |
| Macrocrystalline Talc (mid) (4.2 $\mu m$) | | | 40.68 | | | | |
| Macrocrystalline Talc (fine) (1.6 $\mu m$) | | 40.68 | | | | 40.68 | |
| Microcrystalline Talc (coarse) (6.6) | | | | 40.68 | | | 40.68 |
| Microcrystalline Talc (coarse) (1.5) | | | | | | | |
| Calcined Clay (0.5) | | | | | 26.10 | 26.10 | 26.10 |
| Calcined Clay (1.0) | 26.10 | 26.10 | 26.10 | 26.10 | | | |
| Raw Clay | 15.85 | 15.85 | 15.85 | 15.85 | 15.85 | 15.85 | 15.85 |
| Alumina (10–15 $m^2/g$: 0.7 $\mu m$) | 15.36 | 15.36 | 15.36 | 15.36 | 15.36 | 15.36 | 15.36 |
| Quartz | 2.00 | 2.00 | 2.00 | 2.00 | 2.00 | 2.00 | 2.00 |
| Boehmite (180 $m^2/g$) | | | | | | | |
| Shrinkage (Radial) | 6.2 | 7.3 | 7.2 | 6.3 | 7.1 | 8.3 | 8.2 |

We claim:

1. A method of producing a cordierite honeycomb ceramic body exhibiting a predetermined radial dimension comprising:
   producing a green ceramic honeycomb body that exhibits a radial dimension at least 11% greater than the predetermined radial dimension and shrinking the green body during firing to form a sintered honeycomb ceramic body exhibiting the final predetermined radial dimension and a cell density of at least 500 cpsi;
   the green ceramic body having a batch composition including (i) a magnesium source consisting of a platy or blocky talc exhibiting a mean particle size of less than about 10 $\mu m$; (ii) an $Al_2O_3$-forming source having a mean particle size of less than about 5 $\mu m$ selected from the group consisting of $\alpha$-alumina, transition

TABLE I

| | 1 | 2 | 3 | 4 | 5 | 6 | 7 | 8 | 9 | 10 | 11 |
|---|---|---|---|---|---|---|---|---|---|---|---|
| Macrocrystalline Talc (coarse) (6.2 $\mu m$) | 39.95 | | | | | 39.95 | | | | | |
| Macrocrystalline Talc (mid) (4.2 $\mu m$) | | | | 39.95 | | | | | | | |
| Macrocrystalline Talc (fine) (1.6 $\mu m$) | | 39.95 | | | | | 39.95 | | | | |
| Microcrystalline Talc (coarse) (6.6) | | | 39.95 | | | | | 39.95 | | | |
| Microcrystalline Talc (coarse) (1.5) | | | | | 39.95 | | | | 39.95 | 40.68 | 40.68 |
| Calcined Clay (0.5) | | | | | | 24.73 | 24.73 | 24.73 | 24.73 | | 26.10 |
| Calcined Clay (1.0) | 24.73 | 24.73 | 24.73 | 24.73 | 24.73 | | | | | 26.10 | |
| Raw Clay | 16.55 | 16.55 | 16.55 | 16.55 | 16.55 | 16.55 | 16.55 | 16.55 | 16.55 | 15.85 | 15.85 |
| Alumina (10–15 $m^2/g$: 0.7 $\mu m$) | 5.73 | 5.73 | 5.73 | 5.73 | 5.73 | 5.73 | 5.73 | 5.73 | 5.73 | 15.36 | 15.36 |
| Quartz | 2.00 | 2.00 | 2.00 | 2.00 | 2.00 | 2.00 | 2.00 | 2.00 | 2.00 | 2.00 | 2.00 |
| Boehmite (180 $m^2/g$) | 11.05 | 11.05 | 11.05 | 11.05 | 11.05 | 11.05 | 11.05 | 11.05 | 11.05 | | |
| Shrinkage (Radial) | 10.2 | 11.7 | 11.2 | 13.0 | 10.9 | 10.7 | 12.5 | 12.0 | 13.9 | 9.1 | 9.6 | aluminas, aluminum oxide monohydroxide, and aluminum trihydrate, said alumina-forming source including at least one dispersible boehmite or pseudo-boehmite component with a surface area in excess of 100 m$^2$/gm making up at least about 5% by weight of the batch; and (iii) one or more of the components kaolin, calcined kaolin and silica, essentially including a calcined kaolin component exhibiting a mean particle size of up to about 1 µm and a surface area greater than 10 m$^2$/gm.

2. The method of claim 1 wherein cell density of the sintered ceramic honeycomb body is at least 900 cpsi.

3. A method of producing a cordierite ceramic honeycomb body comprising the following steps:

compounding and plasticizing a ceramic raw material mixture having an oxide composition, in percent by weight of 11 to 17% MgO, 33 to 41% Al$_2$O$_3$ and, 46 to 53% SiO$_2$, the mixture including (i) a magnesium source consisting of a platy or blocky talc exhibiting a mean particle size of less than about 10 µm; (ii) an Al$_2$O$_3$-forming source having a mean particle size of less than about 5 µm selected from the group consisting of α-alumina, transition aluminas, aluminum oxide monohydroxide, and aluminum trihydrate, said alumina-forming source including at least one dispersible boehmite or pseudoboehmite component with a surface area in excess of 100 m$^2$/gm in a proportion of at least 5% by weight of the batch; and (iii) one or more of the components kaolin, calcined kaolin and silica, essentially including a calcined kaolin component exhibiting a mean particle size of up to about 1 um and a surface area greater than 10 m$^2$/gm forming the raw material mixture into a green ceramic honeycomb body by extrusion through an extrusion die;

drying the green body and thereafter firing the green body at a time and at a temperature sufficient to sinter the ceramic body resulting in a radial shrinkage of the green ceramic body in the radial dimension due to the firing of at least 11%.

4. The method of claim 3 wherein the radial shrinkage is measured as the honeycomb diameter shrinkage.

5. The method according to claim 3 wherein the forming of the raw material mixture into a green ceramic body is accomplished by extrusion through a honeycomb extrusion die exhibiting a cell density of at least 400 cpsi thereby producing a sintered ceramic honeycomb exhibiting a cell density of at least 500 cpsi.

6. The method of claim 3 wherein the radial shrinkage due to firing of the green body ranges between about 11 to 14%.

7. The method of claim 5 wherein the cell density of the extrusion die is at least 750 cpsi.

8. The method of claim 5 wherein cell density of the extrusion die is at least 750 cpsi thereby producing a sintered ceramic honeycomb exhibiting a cell density of about 900 cpsi.

* * * * *